(12) United States Patent
Liu et al.

(10) Patent No.: US 12,540,333 B2
(45) Date of Patent: Feb. 3, 2026

(54) CHARACTERIZATION OF IMPURITIES IN ADENO-ASSOCIATED VIRUS (AAV) SAMPLES AND FORMULATION COMPOSITIONS TO STABILIZE AAV

(71) Applicant: Regeneron Pharmaceuticals, Inc., Tarrytown, NY (US)

(72) Inventors: Dingjiang Liu, Pleasantville, NY (US); Bowen Jiang, Foster City, CA (US); Franco Tzul, Cortlandt Manor, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 1130 days.

(21) Appl. No.: 17/516,172

(22) Filed: Nov. 1, 2021

(65) Prior Publication Data
US 2022/0136073 A1     May 5, 2022

Related U.S. Application Data

(60) Provisional application No. 63/108,480, filed on Nov. 2, 2020.

(51) Int. Cl.
| | | |
|---|---|---|
| *C12N 15/86* | (2006.01) | |
| *C12Q 1/70* | (2006.01) | |
| *G01N 21/31* | (2006.01) | |
| *G01N 21/64* | (2006.01) | |
| *G01N 30/74* | (2006.01) | |

(52) U.S. Cl.
CPC .............. *C12N 15/86* (2013.01); *C12Q 1/70* (2013.01); *G01N 21/3103* (2013.01); *G01N 21/6428* (2013.01); *G01N 30/74* (2013.01); *C12N 2750/14143* (2013.01); *G01N 2021/6439* (2013.01)

(58) Field of Classification Search
CPC ................ C12N 15/86; C12N 2750/14143
See application file for complete search history.

(56) References Cited

U.S. PATENT DOCUMENTS 10,512,675 B2 * 12/2019 Bunting ................... A61P 7/04
2008/0299545 A1    12/2008 Zhang et al.

FOREIGN PATENT DOCUMENTS

WO     WO 2020/210600       4/2020
WO     WO-2020113197 A1 *  6/2020 ............ A61K 39/12

OTHER PUBLICATIONS

International Search Report and Written Opinion mailed on Apr. 25, 2022 for International Application No. PCT/US2021/057587.

* cited by examiner

*Primary Examiner* — Jeffrey S Parkin
(74) *Attorney, Agent, or Firm* — McCarter & English, LLP

(57) ABSTRACT

Methods for characterizing DNA impurities in adeno-associated virus (AAV) samples or biopharmaceuticals are provided including the use of size exclusion chromatography and spectrophotometry. Methods and compositions are also provided to minimize leakage of packed DNA from AAV vector including the use of excipients, such as a sugar, an amino acid, a surfactant, or polyols.

6 Claims, 13 Drawing Sheets

CHARACTERIZATION OF IMPURITIES IN ADENO-ASSOCIATED VIRUS (AAV) SAMPLES AND FORMULATION COMPOSITIONS TO STABILIZE AAV

CROSS-REFERENCE TO RELATED APPLICATIONS

This application claims priority to and the benefit of U.S. Provisional Patent Application No. 63/108,480, filed Nov. 2, 2020 which is herein incorporated by reference.

FIELD

The present invention generally pertains to methods for characterizing nucleic acid impurities in samples comprising adeno-associated virus (AAV) vectors using size exclusion chromatography and spectrophotometry. The present application also provides methods and compositions to minimize leakage of packed DNA from an AAV vector.

BACKGROUND

Gene therapy mediates therapeutic effects by delivering an appropriate amount of a therapeutic gene into the target tissue without substantial toxicity, while achieving long-term gene expression, for example by integrating genetic material into the host genome. Gene therapy can include nucleic acids, plasmids, viruses, vectors, or genetically engineered microorganisms. Of all currently available viral vectors including retroviral, lentiviral, adenoviral, and AAV vectors, AAV vectors have been widely used to deliver genetic material for gene therapy.

Evaluations of gene therapy products include evaluating the manufacturing processes to ensure product safety and quality and assessing the product during its manufacturing, storage and distribution steps. Since gene therapy products are typically stored as frozen solutions, it is important to demonstrate the stability of gene therapy products through freeze-thaw cycles and agitation stress. AAV vector based gene therapy products can undergo degradation during freeze-thaw cycles to produce degradation products including degraded viral proteins and DNA impurities. The packed AAV genome inside the vectors may leak out during freeze-thaw cycles or agitation. Thus, various formulation strategies of gene therapy products should be investigated to prepare formulations to increase product stability and minimize product degradation.

It will be appreciated that a need exists for methods to characterize nucleic acid impurities in such gene therapy products during various storage conditions. In addition, a need also exists to provide compositions or formulations comprising AAV vectors having a therapeutic gene that minimize leakage of packed DNA from the AAV vectors.

SUMMARY

The present application provides methods for characterizing and identifying nucleic acid impurities in samples comprising AAV vectors or gene therapy products including the use of size exclusion chromatography and spectrophotometry. The present application also provides methods and compositions to minimize leakage of packed DNA from AAV vectors during storage conditions, such as freeze-thaw cycles and agitation stress, which may occur during manufacturing, transportation, storage and administration.

This disclosure provides a method of identifying nucleic acid impurities in a sample containing AAV vectors. In some exemplary embodiments, this disclosure provides a method comprising: contacting the sample containing AAV vectors to a size-exclusion chromatography (SEC) column, washing the SEC column using a solution to provide at least one eluent, and identifying the nucleic acid impurities in the at least one eluent using a spectrophotometer. In one aspect, the nucleic acid impurities are single-stranded DNA (ssDNA) genomes of AAVs. In another aspect, the nucleic acid impurities are double-stranded DNA (dsDNA). In another aspect, the method of the present application further comprises measuring the absorbance of the at least one eluent at 280 nm using the spectrophotometer and measuring the absorbance ratio of the at least one eluent at 260/280 nm using the spectrophotometer. In one aspect, the method of the present application further comprises quantitating the nucleic acid impurities based on a nucleic acid standard curve. In one aspect, the method of the present application further comprises treating the nucleic acid impurities with a fluorescence dye specially binding to ssDNA. In another aspect, the method of the present application further comprises contacting the sample to a DNA nuclease prior to contacting the sample to the SEC column. In a further aspect, the SEC system is a size-exclusion ultra performance liquid chromatography (SE-UPLC) system. In another aspect, the method of the present application further comprises subjecting the at least one eluent to next-generation sequencing (NGS).

This disclosure, at least in part, provides a composition to protect AAV vectors from leaking packed nucleic acids. In some exemplary embodiments, this disclosure provides a composition comprising at least one AAV vector and at least one excipient; wherein the at least one excipient is a sugar, an amino acid, a surfactant, or a polyol; wherein the at least one AAV vector comprises packed nucleic acids; and wherein the at least one AAV vector in the composition is protected from leaking the packed nucleic acids.

In one aspect, the AAV vector in the composition of the present application is exposed to at least one freeze-thaw cycle. In one aspect, the packed nucleic acids are ssDNA genomes of AAVs, wherein the packed nucleic acids are present inside an AAV capsid. In one aspect, the excipient of the composition of the present application is present at a concentration of about 0.001% to about 10%, wherein the composition further comprises phosphate-buffered saline and non-ionic surfactant. In another aspect, the sugar in the composition of the present application is sucrose, trehalose, mannitol, raffinose, lactose, glucose, maltose, maltotriose, maltotetraose, maltopentaose, or maltoheptaose. In one aspect, the amino acid in the composition of the present application is proline. In one aspect, the surfactant in the composition of the present application is poloxamer 188 (Pluronic® F68). In one aspect, the surfactant in the composition of the present application is a non-ionic surfactant, wherein the surfactant is present at a concentration of about 0.001% to about 0.2%. In another aspect, the composition includes sucrose and poloxamer 188. In a specific aspect, the composition includes sucrose at a concentration of 2.5% to 10% and poloxamer 188 at a concentration of 0.001% to 0.2%.

This disclosure, at least in part, provides a method for protecting an AAV vector from leaking packed nucleic acids. In some exemplary embodiments, the method comprises: obtaining a sample including at least one AAV vector, and adding to the sample a stabilizing composition to form a protective formulation, wherein the protective formulation protects the at least one AAV vector from leaking packed nucleic acids, the stabilizing composition comprises at least one excipient, and the excipient is a sugar, an amino acid, a surfactant, or a polyol. In one aspect, the AAV vector is exposed to at least one freeze-thaw cycle. In one aspect, the packed nucleic acids are ssDNA genome of AAVs, wherein the packed nucleic acids are present inside an AAV capsid.

In another aspect, the excipient is present at a concentration of about 0.001% to about 10% in the protective formulation, wherein the stabilizing composition further comprises phosphate-buffered saline and non-ionic surfactant. In one aspect, the sugar is sucrose, trehalose, mannitol, raffinose, lactose, glucose, maltose, maltotriose, maltotetraose, maltopentaose, or maltoheptaose. In yet another aspect, the amino acid is proline. In one aspect, the surfactant is poloxamer 188 (Pluronic® F68). In one aspect, the surfactant in the composition of the present application is a non-ionic surfactant, wherein the surfactant is present at a concentration of about 0.001% to about 0.2% in the protective formulation. In another aspect, the stabilizing composition includes sucrose and poloxamer 188. In a specific aspect, the stabilizing composition includes sucrose at a final concentration of 2.5% to 10% in the protective formulation and the stabilizing composition includes poloxamer 188 at a final concentration of 0.001% to 0.2% in the protective formulation.

These, and other, aspects of the invention will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the invention.

DETAILED DESCRIPTION

Gene therapy has opened up the prospects of altering, repairing or replacing damaged or mutated genes to improve a patient's health conditions. Adeno-associated virus (AAV) vectors are an ideal tool for gene delivery, and they have become preeminent vectors for human gene therapies. AAVs can be engineered to perform specific functions to deliver nucleic acids for gene therapy applications. The key advantages of AAV include low immunogenicity and pathogenicity, and overall high safety and stability (Naso et al., BioDrugs 31(4) (2017) 317-334; During, Adv Drug Deliv Rev 27(1) (1997) 83-94). AAVs can infect a broad range of cells, regardless of active cell division, while eliciting a mild immune response, which prolongs the duration of transgene expression (During; Carter, Curr Opin Biotech 3(5) (1992) 533-539; Daya and Berns, Clin Microbiol Rev 21(4) (2008) 583-593). In addition, AAVs are not associated with any known illness (Naso et al.; During; Carter; Daya and Berns; Xiao et al., Adv Drug Deliv Rev 12(3) (1993) 201-215; Muzyczka, Viral Expression Vectors, Springer1992, pp. 97-129). Another advantage of AAVs as a gene delivery vehicle is the low risk of random genome integration that can disrupt gene function and potentially trigger insertional mutagenesis (Goswami et al., Front Oncol 9 (2019) 297;

Nguyen et al., Blood 134 (Supplement 1) (2019) 611-611; Lundstrom, Diseases 6(2) (2018) 42).

Figure 1:
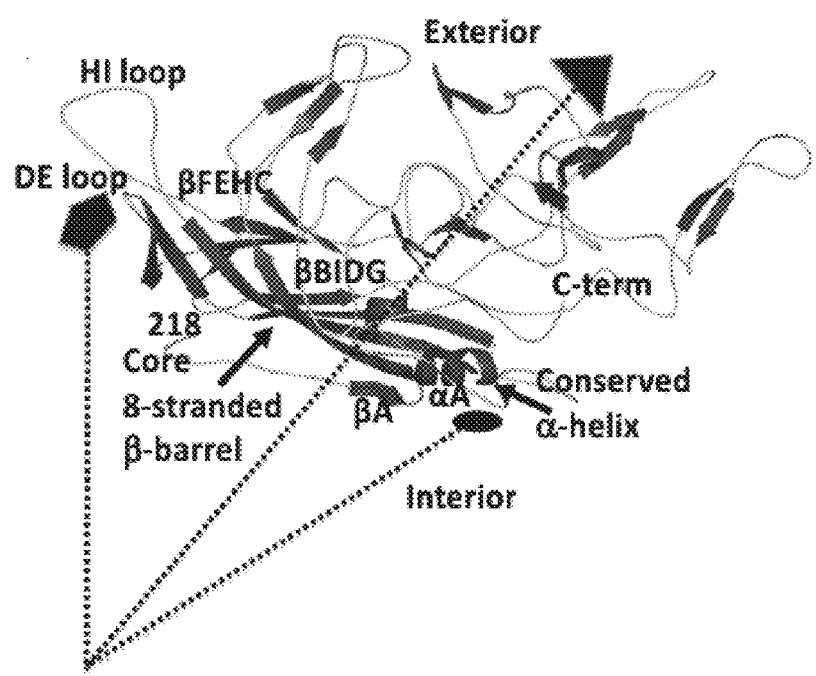
FIG. 1 shows the structure of AAV1 vector including a crystal structure of AAV1 capsid VP3 monomer and a surface representation of AAV1 capsid according to Venkatakrishnan et al.
Figure 1:
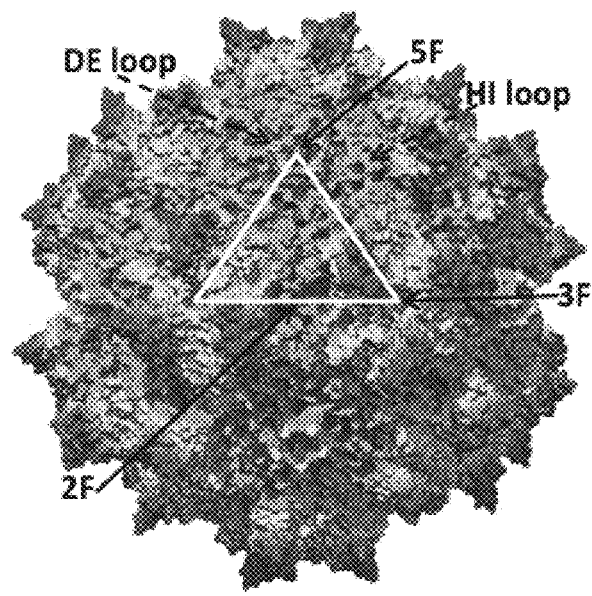

AAVs are non-enveloped viruses and nonpathogenic members of the Parvoviridae family under *Dependovirus* genus and require helpers, such as Adenovirus or Herpesvirus, for infection (Venkatakrishnan et al., Structure and Dynamics of Adeno-Associated Virus Serotype 1 VP1-Unique N-Terminal Domain and Its Role in Capsid Trafficking, Journal of Virology, May, 2013, vol. 87, no. 9, pages 4974-4984). AAVs encapsulate a ssDNA genome of about 4.8 kilobases (kb) in size in an icosahedral capsid which is made of a shell of proteins called capsid viral proteins. FIG. 1 shows the structure of AAV1 including a crystal structure of AAV1 capsid VP3 monomer and a surface representation of AAV1 capsid (Venkatakrishnan et al.). Besides forming the outer capsid shell, the capsid viral proteins are actively involved in cell binding and internalization.

AAV is composed of three capsid proteins, VP1, VP2, and VP3, with single-stranded DNA (ssDNA) encased in the capsid (Agbandje-McKenna and Kleinschmidt, Adeno-Associated Virus, Springer2012, pp. 47-92; Drouin and Agbandje-McKenna, Future virology 8(12) (2013) 1183-1199). After binding to cell receptors, AAVs are then endocytosed and released from the endosome before transporting toward the host nucleus and uncoating to release ssDNA from their capsids. Logically, transduction efficiency depends, at least in part, on the amount of encased ssDNA genome and the integrity of the AAV before reaching the release site (Nonnenmacher and Weber, Gene Ther 19(6) (2012) 649-658; Hauck et al., J Virol 78(24) (2004) 13678-13686; Thomas et al., J Virol 78(6) (2004) 3110-3122).

In order to monitor the quality and efficiency of recombinant AAVs as gene delivery vectors, it is important to monitor purity, capsid identity, vector particle titer and empty/full ratio of AAV biopharmaceuticals. It is also important to demonstrate the stability of AAV biopharmaceuticals under various conditions of storage (such as stable temperature storage and freeze-thaw cycles), diluents (such as serum and solutes with varying pH) and administration. Gene therapy products like AAV biopharmaceuticals are typically stored as frozen solutions. As a result, freeze-thaw cycles during manufacturing, product dose preparation, and administration are inevitable. In rare cases, temperature excursion during transportation or malfunction of freezers during storage could expose biologics to additional freeze-thaw cycles. AAV biopharmaceuticals can undergo degradation with reduced stability during freeze-thaw cycles in storage conditions.

In academic labs, after exerting tremendous effort to design and develop AAV as a gene delivery vector, researchers generally store the vectors in commonly used buffer, such as phosphate-buffer saline (PBS), add relatively high concentrations of glycerol, as a cryoprotectant, and store the AAV material at −80° C. While this has become a somewhat standard protocol, these conditions could potentially be detrimental to AAV function (Boyd, Gene Therapy Technologies, Applications and Regulations (1999) 383; Croyle et al. Gene Ther 8(17) (2001) 1281-1290). In some cases it may also require extensive dilution before administration to reduce the toxicity of Cryoprotectants (Lee et al., Journal of Assisted Reproduction and Genetics 23(2) (2006) 87-91; Armitage et al., Cryobiology 50(1) (2005) 17-20). Studies have shown that titers and transduction efficiency of AAVs decrease after multiple freeze-thaw cycles; however, the cause of this behavior and the mechanism of AAV degradation after freeze-thaw cycles is poorly understood (Croyle et al.; Rodrigues et al., Pharm Res, 2019, 36 (2):29; Howard and Harvey, Human Gene Therapy Methods 28(1) (2017) 39-48).

The present disclosure describes a method of characterizing impurities in AAV samples. Using the method of the present invention, AAV8 samples subjected to freeze-thaw cycles were characterized and it was discovered that increasing numbers of freeze-thaw cycles lead to an increase in a product-related impurity that is detectable by size-exclusion ultra-performance liquid chromatography (SE-UPLC). Further characterization of these AAV8 samples showed that the impurity mainly consists of genomic DNA that leaks out of the AAV capsid. Similar behavior was also observed in other AAV serotypes.

Figure 2:
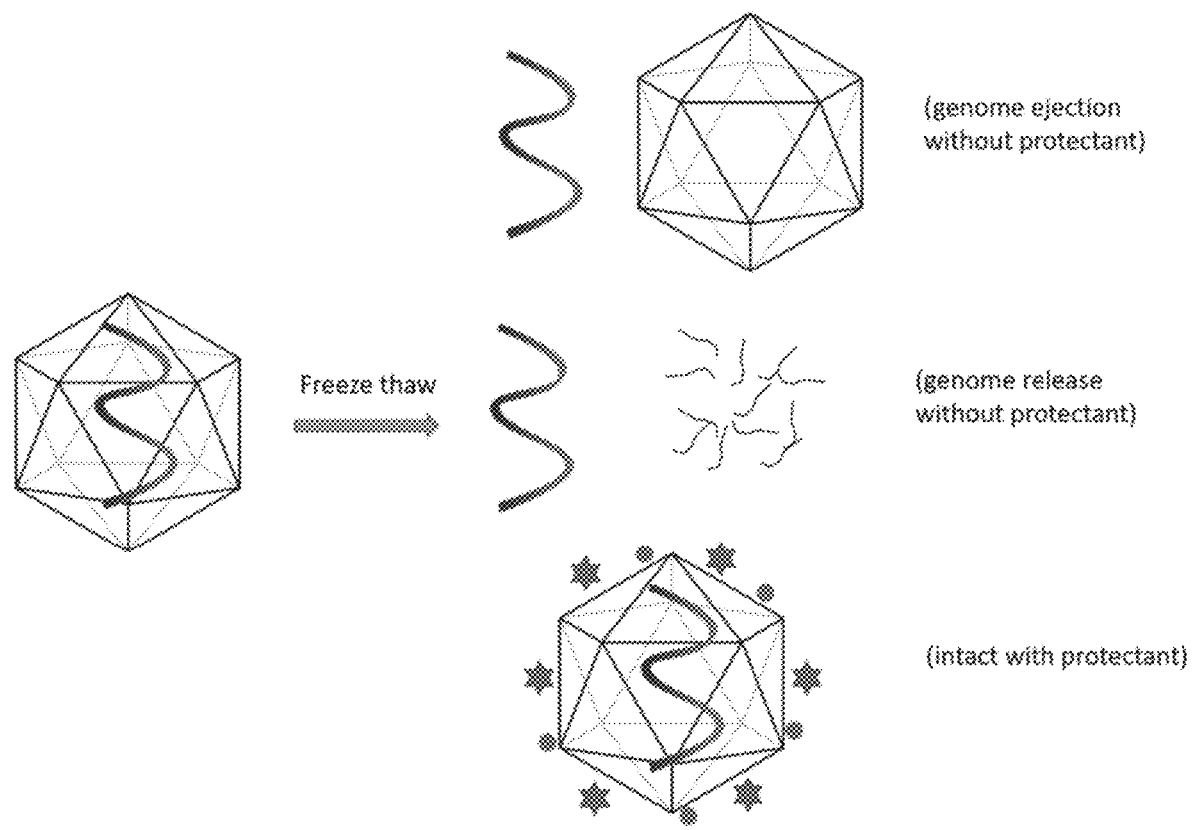
FIG. 2 illustrates the effect of freeze-thawing an AAV vector with or without a protective formulation according to an exemplary embodiment.

When the capsids of AAV are damaged during freeze-thaw cycles, the packed ssDNA AAV genome inside capsids may leak out, as shown in FIG. 2. The observation of the presence of free ssDNA in AAV biopharmaceuticals indicates the reduced stability of AAV biopharmaceuticals during storage. Various excipients may be added to the gene delivery products to increase product stability and minimize product degradation. The excipient may include a buffer, lyoprotector, tonicity agent, and surfactant (Rodrigues et al.). Additional formulations are described in detail below.

A need exists for methods to characterize DNA impurities in AAV samples or biopharmaceuticals during various storage conditions. In addition, stabilizing compositions or formulations of AAV biopharmaceuticals should be provided to minimize leakage of packed DNA from AAV vectors during storage conditions.

The present application provides methods for identifying DNA impurities, such as ssDNA genomes of AAVs, in AAV samples or biopharmaceuticals including the use of SEC to separate the DNA impurities from the AAV vector. Subsequently, the SEC fractions are monitored using a spectrophotometer. The present application also provides methods and compositions to minimize leakage of packed DNA from AAV vectors including the use of excipients in the presence of phosphate buffer, salt and a non-ionic surfactant.

There is a need to develop methods which are rapid, reliable, sensitive and high throughput for determining and monitoring impurities in AAV biopharmaceuticals. Any component in purified AAV biopharmaceuticals that is not a desired product, not a product-related substance, or not an intended formulation excipient, can be considered as an impurity. Examples of vector product-related impurities include empty AAV capsid particles and AAV particles encapsidating unintended nucleic acid fragments. Additional DNA impurities may include the ssDNA of AAV genomes which are leaked out from the capsids of AAVs during purification, after purification or during storage. Impurities may include helper-virus-dependent replication-competent AAV particles which can be unintentionally generated by recombination events in the biosynthetic milieu of the vector generation system.

Furthermore, impurities in AAV biopharmaceuticals may also include residual levels of proteins and nucleic acids derived from the cell culture which are used to generate AAVs. The abundant residual protein impurities may include host cell proteins and bovine serum albumin. The abundant residual nucleic acids may include host cell DNA/RNA and DNA from helper components, such as plasmids or viruses. Residual host cell DNA can be present in two forms, including nuclease-sensitive process-related impurities and nuclease-resistant product-related impurities. The nuclease-sensitive process-related impurities include nucleic acids which are non-specifically co-purified with the desired AAV vector products. The nuclease-resistant product-related impurities include nucleic acids which are encapsidated within AAV particles. Minimizing these distinct forms of residual host cell DNA requires different manufacturing process optimization strategies. (J. F. Wright, Product-related impurities in clinical-grade recombinant AAV vectors: characterization and risk assessment, Biomedicines, 2014, 2, 80-97) Removal of DNA impurities in AAV biopharmaceuticals is complicated, even though nuclease treatment is used to remove accessible nucleic acids during AAV vector purification. Undesirable DNA fragments may be packaged, which are resistant to nuclease treatment due to vector particle integrity.

Since AAV capsids encapsulate a ssDNA genome in an icosahedral capsid which is made of a shell of proteins, for example, capsid viral proteins, capsids should be stable to protect the AAV genome until a suitable host cell appears to initiate cell entry for releasing AAV genomes for replication. The assembly of viral capsid proteins of AAVs can have significant impact on viral infectivity and vector potency (Jin et al., Direct liquid chromatography/mass spectrometry analysis for complete characterization of recombinant adeno-associated virus capsid proteins, Human gene therapy methods, 2017, Vol. 28, No. 5, pages 255-267). The capsid viral proteins of AAVs may play a role in the initiation of both second-strand synthesis and transcription of the input genome (Salganik et al., Adeno-associated virus capsid proteins may play a role in transcription and second-strand synthesis of recombinant genomes, Journal of Virology, January 2014, Vol. 88, No. 2, pages 1071-1079). The degradation of capsid proteins can be detrimental to infectivity of AAVs, which can cause the leakage of AAV ssDNA genome. AAV ssDNA genome can also be ejected without breakage of the capsid (Bernaud, Julien, et al. Characterization of AAV vector particle stability at the single-capsid level. Journal of biological physics, 2018, Vol. 44, No. 2, pages 181-194).

AAV ssDNA genomes contains three genes including rep (replication), cap (capsid) and aap (assembly). The rep gene is relevant to viral genome replication and packaging. The cap gene encodes capsid viral proteins. The expression of the cap gene produces capsid viral proteins including VP1, VP2, and VP3, made from alternately spliced mRNAs with common C termini. VP3 is approximately 61 kDa and constitutes about 85% of the capsid protein contents. VP2 is approximately 73 kDa. VP1 is approximately 87 kDa. VP1 and VP2 contain N-terminal extension (VP1u) including a phospholipase A2 domain and nuclear localization signals (Rayaprolu et al., Comparative analysis of adeno-associated virus capsid stability and dynamics, Journal of Virology, December 2013, vol. 87, No. 24, p. 13150-13160). The capsid of AAV consists of 60 viral protein monomers including VP1, VP2, and VP3. VP3 is the major capsid protein. There are approximately 50 copies of VP3 in AAV capsid. There are approximately 5 copies of VP1 and 5 copies of VP2 in AAV capsid (Venkatakrishnan et al.).

The present application provides methods for characterizing, identifying and/or quantitating DNA impurities in AAV samples or biopharmaceuticals including the use of SEC to separate the DNA impurities from the AAV vector. Subsequently, the SEC fractions are monitored using a spectrophotometer. The present application also provides methods and compositions to minimize leakage of packed DNA from AAV vectors including the use of excipients in the presence of PBS and a non-ionic surfactant. In some exemplary embodiments, the present application provides a method of identifying DNA impurities in a sample containing AAV vectors, the method comprising: contacting the sample to a SEC column, washing the SEC column using a solution to provide eluents, and identifying the nucleic acid impurities in the eluents using a spectrophotometer. Samples containing AAV vectors are loaded to SEC columns. The fractions passing through SEC column are monitored using a spectrophotometer to measure the absorbance of the SEC fractions at 280 nm. One main peak corresponding to AAV vectors can be observed in SEC fractions in the SEC elution profile. The main peak has significant absorbance at 280 nm detected using a spectrophotometer. One small peak corresponding to DNA impurities is observed in SEC fractions in the SEC elution profile. The small peak has absorbance at 280 nm detected using a spectrophotometer.

In one aspect, the DNA impurities in samples containing AAV vectors are ssDNA genomes of AAVs. In one aspect, the SEC fractions are analyzed using a spectrophotometer to measure the absorbance ratio at UV 260/280 nm for assessing nucleic acid purity. In one aspect, the method of the present application comprises measuring the absorbance of the eluent at 280 nm and measuring the absorbance ratio of the eluent at 260/280 nm using the spectrophotometer. In one aspect, the method of the present application further comprises quantitating the DNA impurities based on a nucleic acid standard curve in combination with treating the DNA impurities with a fluorescence dye.

In some exemplary embodiments, the present application provides methods and stabilizing compositions to protect AAV vectors from leaking the packed nucleic acids during storage conditions, such as freeze-thaw cycles and agitation. In some aspects, the stabilizing composition comprising AAV vectors and excipients includes a sugar, an amino acid, a surfactant, or polyols. In some aspects, the method for protecting an AAV vector from leaking packed nucleic acids includes mixing the AAV vector with the stabilizing composition.

In one aspect, the excipient of the stabilizing composition of the present application is present at a concentration of about 0.001% to about 10%, wherein the stabilizing composition further comprises phosphate-buffered saline and non-ionic surfactant. In one aspect, the sugar in the stabilizing composition of the present application is sucrose, trehalose, mannitol, raffinose, lactose, glucose, maltose, maltotriose, maltotetraose, maltopentaose, or maltoheptaose. In another aspect, the amino acid in the stabilizing composition of the present application is proline. In yet another aspect, the surfactant in the stabilizing composition of the present application is Pluronic® F68. In one aspect, the surfactant in the stabilizing composition of the present application is a non-ionic surfactant, wherein the surfactant is present at a concentration of about 0.001% to about 0.2%

The demands of evaluating gene delivery products to ensure product safety and quality have led to an increasing demand to characterize DNA impurities in AAV samples or biopharmaceuticals during various storage conditions. In addition, a need also exists to provide compositions or formulations of AAV biopharmaceuticals to minimize leakage of packed DNA from AAV vectors. Exemplary embodiments disclosed herein satisfy the aforementioned demands by providing methods and compositions to satisfy the long felt needs.

The term "a" should be understood to mean "at least one"; and the terms "about" and "approximately" should be understood to permit standard variation as would be understood by those of ordinary skill in the art; and where ranges are provided, endpoints are included. As used herein, the terms "include," "includes," and "including," are meant to be non-limiting and are understood to mean "comprise," "comprises," and "comprising," respectively.

In some exemplary embodiments, the present application provides a method of identifying nucleic acid impurities in a sample containing AAV vectors, the method comprising: contacting the sample containing AAV vectors to a size-exclusion chromatography (SEC) column, washing the SEC column using a solution to provide at least one eluent, and identifying the nucleic acid impurities in the at least one eluent using a spectrophotometer.

As used herein, the term "vector" refers to a recombinant plasmid or virus that carries a nucleic acid to be delivered into a host cell, either in vitro or in vivo.

The vectors derived from AAV are particularly attractive for delivering genetic material because (i) they are able to infect (transduce) a wide variety of non-dividing and dividing cell types including muscle fibers and neurons; (ii) they are devoid of the virus structural genes, thereby eliminating the natural host cell responses to virus infection, for example, interferon-mediated responses; (iii) wild-type viruses have never been associated with any pathology in humans; (iv) in contrast to wild type AAVs, which are capable of integrating into the host cell genome, replication-deficient AAV vectors generally persist as episomes, thus limiting the risk of insertional mutagenesis or activation of oncogenes; and (v) in contrast to other vector systems, AAV vectors do not trigger a significant immune response (see ii), thus granting long-term expression of the therapeutic transgenes (provided their gene products are not rejected).

As used herein, the term "impurities" refers to any component in purified AAV samples that is not a desired product, not a product-related substance, or not an intended formulation excipient. DNA impurities may include the ssDNA of AAV genome which is leaked out from the capsids of AAVs during purification, after purification or during storage. Impurities may include helper-virus-dependent replication-competent AAV particles which can be unintentionally generated by recombination events in the biosynthetic milieu of the vector generation system. Impurities remaining after the purification of AAVs may include residual levels of proteins and nucleic acids derived from components of the cell culture used to generate AAVs. Residual protein impurities may include host cell proteins and bovine serum albumin. Residual nucleic acids may include host cell DNA/RNA and DNA from helper components, such as plasmids or viruses. Residual host cell DNA can be present in two forms: (1) as a nuclease-sensitive process-related impurity, for example, impurities non-specifically co-purified with the desired AAV vector products; and (2) as a nuclease-resistant product-related impurity, for example, impurities encapsidated within AAV particles (J. F. Wright).

As used herein, a "nucleic acid" refers to a DNA or RNA molecule. In some exemplary embodiments, the term nucleic acid captures sequences that include any of the known base analogues of DNA and RNA such as, but not limited to 4-acetylcytosine, 8-hydroxy-N6-methyladenosine, aziridinylcytosine, pseudoisocytosine, 5-(carboxyhydroxyl-methyl) uracil, 5-fluorouracil, 5-bromouracil, 5-carboxymethylaminomethyl-2-thiouracil, 5-carboxymethylaminomethyluracil, dihydrouracil, inosine, N6-isopentenyladenine, 1-methyl adenine, 1-methylpseudouracil, 1-methylguanine, 1-methylinosine, 2,2-dimethylguanine, 2-methyladenine, 2-methylguanine, 3-methyl-cytosine, 5-methyl cytosine, N6-methyladenine, 7-methylguanine, 5-methylaminomethyluracil, 5-methoxyamino-methyl-2-thiouracil, beta-D-mannosylqueosine, 5'-methoxycarbonylmethyluracil, 5-methoxyuracil, 2-methylthio-N6-isopentenyladenine, uracil-5-oxyacetic acid methylester, uracil-5-oxyacetic acid, oxybutoxosine, pseudouracil, queosine, 2-thiocytosine, 5-methyl-2-thiouracil, 2-thiouracil, 4-thiouracil, 5-methyluracil, -uracil-5-oxyacetic acid methylester, uracil-5-oxyacetic acid, pseudouracil, queosine, 2-thiocytosine, and 2,6-diaminopurine.

As used herein, the term "size-exclusion chromatography" or "SEC" refers to a chromatographic method, for example, molecular sieve chromatography, which can separate molecules in solution based on size (such as molecular weight) by filtration through a matrix. The matrix, such as gel, consists of spherical beads containing pores having specific size distributions. When molecules of different sizes are included or excluded from the pores within the beads, molecules can be separated by their sizes. A molecule having smaller size can diffuse into the pores, which increases the time period required for the smaller molecule to pass through the SEC column. However, a molecule having large size does not enter the pores. When large molecules do not enter the pores, they are eluted in the SEC column's void volume. In general, the time period for a large molecule to pass through the SEC column is less compared to that of the smaller molecules. Thus, the molecules can be separated by size through the SEC column, since the time periods for the molecules with different sizes to pass through the SEC column are different. SEC can be used to separate large molecules or macromolecular complexes, such as protein complexes. Commonly, the buffer used in SEC is formulated to preserve the native structures and conformations of biomolecules in solution allowing separation of biomolecules without disturbing their native structures and conformations.

As used herein, the term "spectrophotometer" includes an instrument which can measure quantitatively absorbed light intensity as a function of wavelength, such as an absorption spectrophotometer. A spectrophotometer contains a monochromator or a prism to produce a light beam containing desired wavelengths, and a means of measuring the ratio of that beam's intensity as it enters and leaves a cuvette or flow cell. In UV-visible spectrophotometers, a beam of light from a suitable UV and/or visible light source is passed through a prism or diffraction grating monochromator. The light then passes through the sample to be analyzed before reaching the detector. The spectrophotometer may also be a part of the SEC-HPLC/UPLC system and be a detector.

EXEMPLARY EMBODIMENTS

Embodiments disclosed herein provide methods for characterizing and identifying DNA impurities in AAV samples or biopharmaceuticals. Embodiments disclosed herein also provide methods and compositions to minimize leakage of packed DNA from AAV vectors.

In some exemplary embodiments, the present application provides a method of identifying nucleic acid impurities in a sample containing AAV vectors, the method comprising: contacting the sample containing AAV vectors to a SEC column, washing the SEC column using a solution to provide at least one eluent, and identifying the nucleic acid impurities in the at least one eluent using a spectrophotometer. In one aspect, the nucleic acid impurities are single-stranded DNA genomes of AAVs.

In some exemplary embodiments, the present application provides a composition to protect AAV vectors from leaking the packed nucleic acids, wherein the composition comprises at least one excipient including a sugar, an amino acid, a surfactant, or polyols. In one aspect, the excipient of the composition of the present application is present at a concentration of about 0.001% to about 10%, from about 0.001% to about 8%, from about 0.001% to about 6%, from about 0.05% to about 5%, from about 0.1% to about 10%, from about 0.1% to about 8%, from about 0.1% to about 6%, from about 0.1% to about 5%, about 5%, about 4%, about 3%, about 2.5%, about 2%, about 1.5%, about 1%, about 0.1%, about 0.05%, or about 0.001%.

In one aspect, the composition further comprises phosphate-buffered saline and non-ionic surfactant. In another aspect, the sugar in the composition of the present application is sucrose, trehalose, mannitol, raffinose, lactose, glucose, maltose, maltotriose, maltotetraose, maltopentaose, or maltoheptaose. In another aspect, the amino acid in the composition of the present application is proline. In yet another aspect, the surfactant in the composition of the present application is Pluronic® F68. In one aspect, the surfactant in the composition of the present application is a non-ionic surfactant, wherein the surfactant is present at a concentration of about 0.001% to about 0.2%, about 0.1%, about 0.05%, or about 0.001%.

It is understood that the system is not limited to any of the aforesaid adeno-associated viruses, size-exclusion chromatography, spectrophotometer, ssDNA, AAV vectors, and excipients.

The consecutive labeling of method steps as provided herein with numbers and/or letters is not meant to limit the method or any embodiments thereof to the particular indicated order. Various publications, including patents, patent applications, published patent applications, accession numbers, technical articles and scholarly articles are cited throughout the specification. Each of these cited references is incorporated herein by reference, in its entirety and for all purposes. Unless described otherwise, all technical and scientific terms used herein have the same meaning as commonly understood by one of ordinary skill in the art to which this invention belongs. This disclosure will be more fully understood by reference to the following Examples, which are provided to describe this disclosure in greater detail. They are intended to illustrate and should not be construed as limiting the scope of this disclosure.

EXAMPLES

Spectrophotometer: A spectrophotometer was used to detect and monitor proteins and nucleic acids in the fractions obtained from size-exclusion chromatography column. The protein detection was performed using absorbance at 280 nm. The DNA or RNA detection was performed using absorbance at 260 nm. Proteins in solution absorb ultraviolet light with absorbance maxima at 280 and 200 nm. Amino acids with aromatic rings have an absorbance peak at 280 nm. Nucleic acids can be quantitated by measuring the amount of ultraviolet radiation absorbed by the bases at 260 nm using a spectrophotometer. DNA nucleotides contain a sugar backbone, a base and a phosphate group. The base is nitrogen rich, which absorbs light at 260 nm. For a 1-cm pathlength of light, the optical density at 260 nm ($OD_{260}$, absorbance at 260 nm) equals 1.0 for the following solutions: a 50 μg/mL solution of double-stranded DNA, a 33 μg/mL solution of single-stranded DNA, a 20-30 μg/mL solution of oligonucleotide, or a 40 μg/mL solution of RNA.

DNA samples can contain impurities which can affect the absorbance at 260 nm. The absorbance ratio at 260/280 nm was analyzed to assess nucleic acid purity. Pure DNA has an absorbance ratio at 260/280 nm of about 1.8.-2.0. Pure RNA has an absorbance ratio at 260/280 nm of about 2.0. A high quality DNA or RNA sample should have an absorbance ratio at 260/280 nm above about 1.7. When the observed absorbance ratio at 260/280 nm for DNA or RNA solution is low, it indicates the possibility of contamination caused by protein or phenol. The absorbance maximum at 280 nm indicates the possibility of protein contamination. The absorbance maximum at 230 nm indicates the possibility of phenolate or thiocyanate contamination. The absorbance maximum at 340 nm indicates scattering of light caused by particulates.

Sample Preparation. For freeze-thaw studies, 100 μL of AAV solutions in 1 mL glass vials were frozen in −80° C. for at least one hour and subsequently thawed at room temperature for at least 30 minutes to complete one cycle.

To characterize the effect of benzonase on the SE-UPLC Peak 1, Benzonase® (Millipore Sigma, Burlington, MA) was added into the AAV8.GFP solution at a volume ratio of 1:50 and mixed thoroughly before SE-UPLC analysis.

For formulation screening studies, different AAV serotypes were adjusted to a genome titer of $3.7 \times 10^{12}$ vg/mL. The 2-fold concentrated formulation buffer was then mixed with different AAV serotype samples to reach the target formulations, and these samples were subjected to the freeze-thaw cycles. Analysis was performed at t=0 and after 1, 2, 4, or 10 freeze-thaw cycles.

SE-UPLC. AAV8.GFP samples were analyzed using a Sepax SEC 5 μm, 4.6×300 nm column with 500 angstrom pore size running in a Waters ACQUITY UPLC system. A calibration curve was built by injecting 1, 5, 10, 15, and 20 μL of standards at $1.83 \times 10^{12}$ vg/mL. 10 μL of AAV8 samples were subsequently injected and eluted at a flow rate of 0.5 mL/min with 2×DPBS as the mobile phase. The elution was monitored by a photodiode array detector, and the spectrum ranging from 210 to 400 nm was recorded for further analysis.

To fractionate the different species in the SE-UPLC elution profile, a Waters Fraction Manager-Analytical was connected to the ACQUITY UPLC system and used to collect the fractions eluted at corresponding retention time. A number of repeated injections were performed, and the fractions from multiple injections were pooled together followed by concentrating up 5 fold (reduction in volume) with Amicon Ultra-0.5 centrifugal filter units. The collected fractions were subjected to next generation sequencing (NGS) to confirm the identity.

Next Generation Sequencing. Sample preparation was performed using the protocol described by Lecomte et al. with minor modifications (Lecomte et al., Molecular Therapy-Nucleic Acids 4 (2015) e260). To identify the impurity peak (Peak 1 in the SE-UPLC profile before the main elution peak), the DNA isolation was performed without any DNase treatment. Illumina libraries were prepared using the Nextera XT DNA library preparation kit following manufacturer's instructions. The final pool was sequenced in a NextSeq550 using a 150 cycles mid-output kit. The sequencing reads were analyzed using an in-house data analysis pipeline.

Fluorescent Based Free DNA Assay. Quant-iT™ OliGreen® ssDNA Assay Kit (Invitrogen™) was purchased from Thermo Fisher Scientific. Before use, the 200× stock Quant-iT OliGreen ssDNA reagent and the 100 μg/mL oligonucleotide standard were warmed up to room temperature. The 20× stock TE buffer was diluted 20-fold with Milli-Q water to the working concentration (10 mM Tris-HCl, 1 mM EDTA, pH 7.5). The TE buffer was then used to dilute the reagent and the oligonucleotide standard to the working concentrations according to the user guide. The AAV and oligonucleotide standard samples were mixed with the reagent using the ratio in the user guide and the ssDNA in the AAV samples was interpolated using the standard linear curve generated from five samples containing different concentrations (0, 10, 100, 500, and 1000 ng/mL) of the oligonucleotide standard. The samples were placed in a 384-well plate and analyzed using a Synergy™ Neo2 Multi mode Reader (BioTek). The excitation and emission wavelengths were set at 480 nm and 520 nm respectively.

Example 1. Characterization of DNA Impurities in AAV Samples

Figure 3:
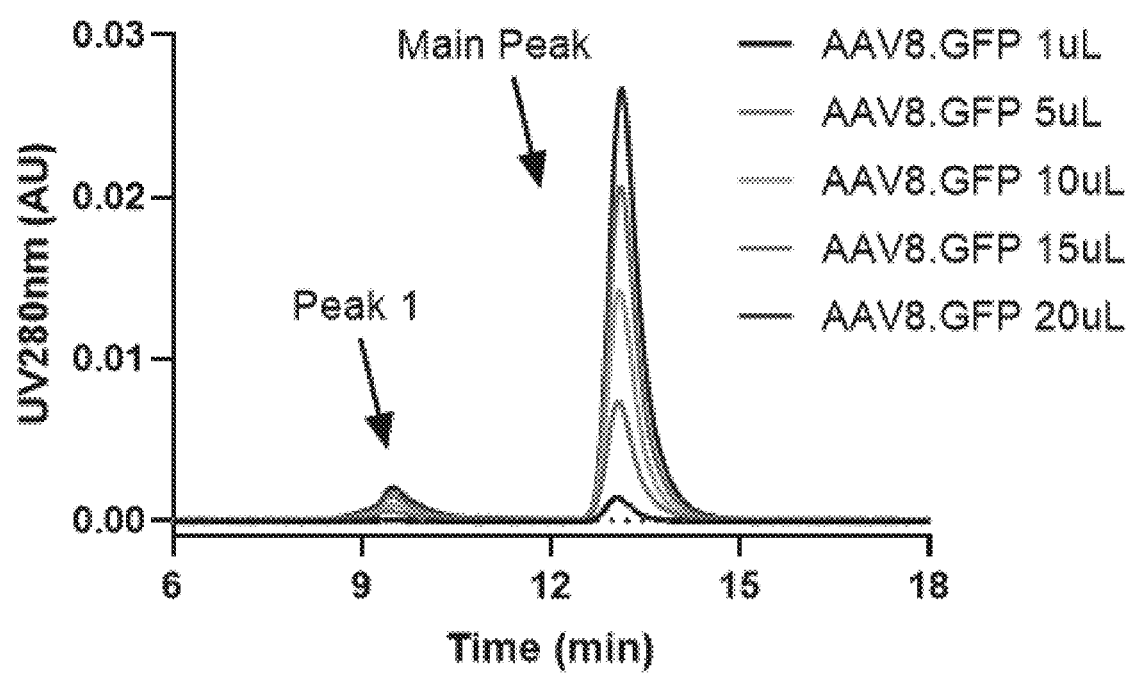
FIG. 3 shows absorbance of SEC fractions of AAV8-GFP samples at 280 nm according to an exemplary embodiment. Different amounts of AAV8-GFP samples were loaded to SEC columns, such as 1 µL, 5 µL, 10 µl, 15 µL, or 20 µL of samples according to an exemplary embodiment.

AAV serotype 8 (AAV8) was generated in HEK-293 cells and reported to contain at least $5 \times 10^{12}$ genome copies/mL in PBS with 0.001% Pluronic® F68. AAV8 containing payload GFP (green fluorescence protein), for example, AAV8-GFP, was used for the analysis of DNA impurities. Different amounts of AAV8-GFP samples were analyzed using SEC columns, such as 1 µL, 5 µL, 10 µL, 15 µL, or 20 µL of samples. AAV8-GFP samples were loaded to size-exclusion chromatography (SEC) columns. The fractions passing through the SEC column were monitored using a spectrophotometer to measure the absorbance of the SEC fractions at 280 nm as shown in FIG. 3. In FIG. 3, the Y axis represents absorbance at 280 nm in absorbance unit (AU) and the X axis is expressed as retention time of the fractions passing through the column. As shown in FIG. 3, one main peak corresponding to AAV8-GFP viral particles at retention time between 12 and 15 minutes was observed in SEC fractions in the SEC elution profile, which had significant absorbance at 280 nm detected using a spectrophotometer. One small peak having absorbance at 280 nm at retention time between 8 and 11 minutes was observed in the SEC elution profile, for example, peak 1 in FIG. 3.

Figure 4:
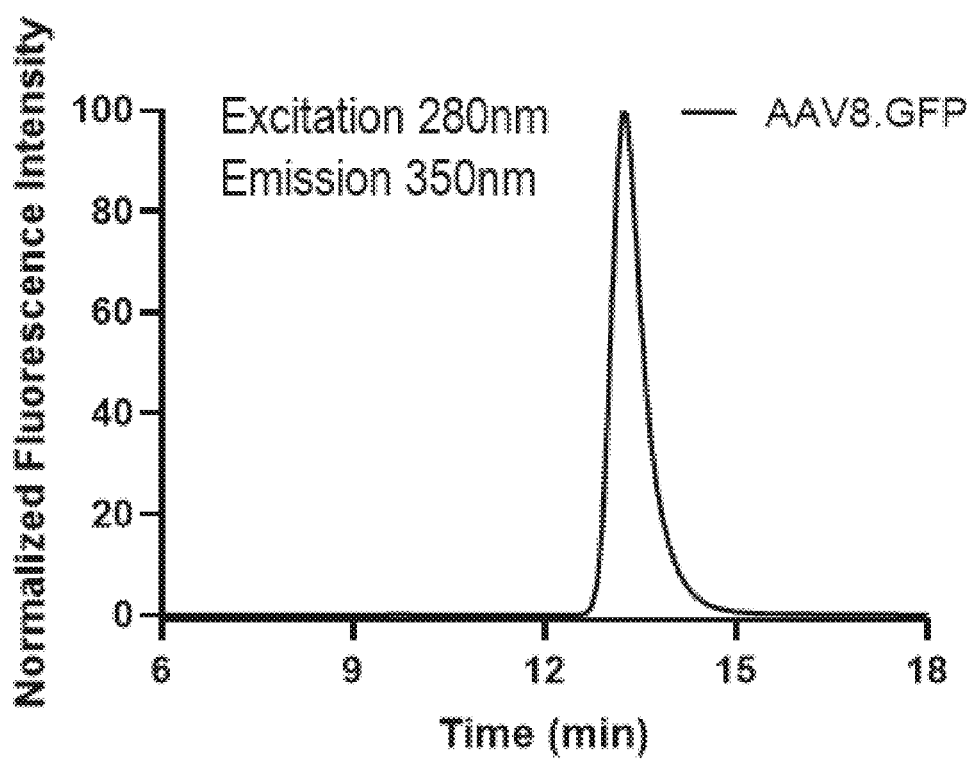
FIG. 4 shows fluorescence intensities of SEC fractions of AAV8-GFP samples monitored at 280 nm excitation and 350 nm emission according to an exemplary embodiment.

The fluorescence intensities of the SEC fractions were also monitored at 280 nm excitation and 350 nm emission as shown in FIG. 4. In FIG. 4, the Y axis represents normalized fluorescence intensity and the X axis is expressed as retention time of the fractions passing through the SEC column. The fractions corresponding to the main peak of FIG. 3 appeared as a similar peak with significant fluorescence intensities at the same retention time, between 12 and 15 minutes, as shown in FIG. 4. The fractions corresponding to peak 1 of FIG. 3 did not show detectable fluorescence intensity (at 280 nm excitation and 350 nm emission) at the corresponding retention time, between 8 and 11 minutes, as shown in FIG. 4.

Furthermore, peak 1 and the main peak of the SEC fractions were analyzed using a spectrophotometer to measure the absorbance ratio at UV 260/280 nm for assessing nucleic acid purity. As shown in Table 1, peak 1 of the SEC fractions showed the reading of 1.7 for UV 260/280 nm, indicating good purity of DNA without protein contamination. The SEC fractions of the main peak showed a reading of 1.3 for UV at 260/280 nm, indicating the presence of proteins. The UV-vis of bulk DS (drug substance containing AAV biopharmaceuticals) showed a reading of 1.3 for UV at 260/280 nm corresponding to purified AAV vector. When the AAV8-GFP samples were treated with nucleases, the intensity of peak 1 reduced significantly. The results indicated that the SEC fractions corresponding to peak 1 contain DNA. The result further indicated that peak 1 of the SEC fractions may contain ssDNA of AAV genome.

TABLE 1

Absorbance ratios at 260/280 nm of the SEC fractions

| Samples | UV 260/280 nm |
|---|---|
| SEC Peak 1 | 1.7 |
| SEC Main Peak | 1.3 |
| UV-vis of Bulk DS | 1.3 |

Since the results indicated that peak 1 contained high purity DNA without protein contamination, the combination of SEC and measuring absorbance can be used effectively to quantitate ssDNA impurities in AAV samples. AAV samples can be loaded to a SEC column to separate DNA impurities from AAV vectors. The SEC fractions can be monitored at absorbance 280 nm to identify DNA impurities and AAV vectors in the SEC elution profile. Subsequently, the SEC fractions containing DNA impurities can be quantitated by measuring the absorbance at 260 nm. The purity of DNA can be assessed by measuring the absorbance ratio at 260/280 nm. The DNA impurities in purified AAV samples may include ssDNA which was leaked out from AAV capsids during errant storage conditions, such as freeze-thaw cycles and agitation.

Example 2. Characterization of ssDNA Leakage after Treatment of Freeze-Thaw Cycles Currently, AAV gene therapy drug products are stored as frozen liquids to preserve product quality and stability; therefore, AAV particles are subjected to multiple freeze-thaw cycles during manufacturing, shipping, storage, and administration. Thus, multiple freeze-thaw cycles were selected as one of the stress conditions in the characterization and stability studies to understand the stability of AAV8 formulation and to determine the potential degradation pathway.

AAV8 containing GFP payload was used as source material to characterize ssDNA leakage after treatments of freeze-thaw cycles. Source material containing $8.34 \times 10^{12}$ vg/mL AAV8-GFP in PBS with 0.001% pluronic F68 at pH 7.4 was used for this analysis. Samples containing different AAV titers were prepared using the source material. The source material was concentrated using an Amicon centrifuge filter to reach the desired target concentration (higher concentration), such as titers at 2× (concentrated 2 times), 4×, and 10×. The freeze-thaw cycle was conducted by freezing the sample containing AAV vectors at −80° C. for one hour or longer followed by thawing at room temperature for 0.5 hours or longer. Unless described otherwise, eight freeze-thaw cycles were conducted for sample treatments.

Figure 5:
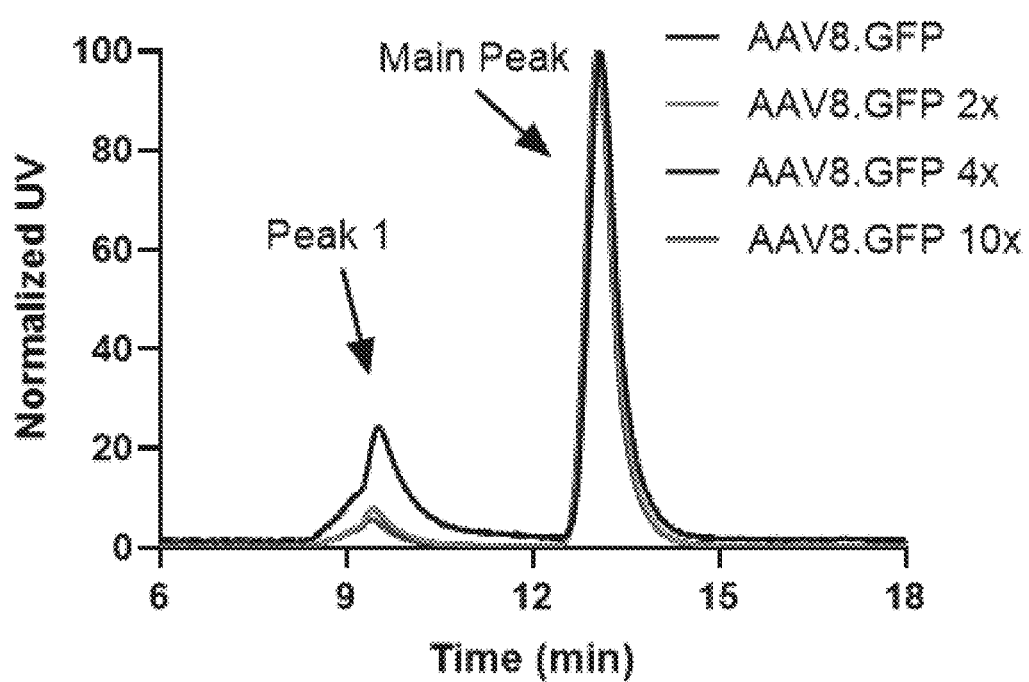
FIG. 5 shows absorbance of SEC fractions of AAV8-GFP samples at 280 nm according to an exemplary embodiment. Different concentrations (titers) of AAV8-GFP samples were loaded to SEC columns according to an exemplary embodiment.

AAV8-GFP samples which were treated with eight freeze-thaw cycles were loaded to a SEC column including the source material (AAV8.GFP in FIG. 5) and samples at different titers, such as titers at 2×, 4×, and 10× as shown in SEC chromatograms in FIG. 5. The fractions passing through the SEC column were monitored using a spectrophotometer to measure the absorbance of the SEC fractions at 280 nm. In FIG. 5, the Y axis represents normalized absorbance at 280 nm (UV) and the X axis is expressed as retention time of the fractions passing through the SEC column. As shown in FIG. 5, one main peak corresponding to AAV8-GFP viral particles at a retention time between 12 and 15 minutes was observed in SEC fractions in the SEC elution profile. The main peak had significant absorbance at 280 nm detected using a spectrophotometer. One small peak having absorbance at 280 nm at retention time between 8 and 11 minutes was observed, labeled as peak 1 in FIG. 5, in the SEC elution profile.

The size of peak 1 in the SEC elution profile increased significantly after the treatments of eight freeze-thaw cycles for AAV8-GFP samples. The increase of the size of peak 1 was dependent on the concentration of AAV8-GFP, for example, titer of AAVs. Table 2 shows size variation of peak 1 before and after treatments of eight freeze-thaw cycles in a SEC elution profile. The results showed that the size of peak 1 increased significantly after freeze-thaw treatments, which indicated the release of ssDNA of AAV genomes from viral capsid after freeze-thaw treatments. Furthermore, peak 1 and the main peak of the SEC fractions were analyzed using a spectrophotometer to measure the absorbance ratio at UV 260/280 nm for assessing nucleic acid purity. As shown in Table 3, peak 1 of the SEC fractions showed a reading of 2.1 for UV 260/280 nm, indicating good purity of DNA with minimal protein. The main peak of the SEC fractions showed a reading of 1.4 for UV 260/280 nm, indicating the presence of proteins. The UV-vis of bulk DS showed a reading of 1.3 for UV at 260/280 nm corresponding to viral particles.

In addition, dynamic light scattering (DLS) was used to determine the size distribution profile of a sphere for AAV vector in samples. Table 4 shows the hydrodynamic radius (in nm) of AAV vector before and after treatments of eight freeze-thaw (F/T) cycles detected by DLS.

TABLE 2

Size variations of peak 1 before and after freeze-thaw treatments
Size variations of peak 1 in SEC fractions

| Titer | % Peak 1 Before | % Peak 1 After | % Peak 1 amount (mg) |
|---|---|---|---|
| Source | 7.8% | 27.9% | 0.008 |
| 2× | 6.8% | 11.0% | 0.011 |
| 4× | 6.8% | 10.7% | 0.013 |
| 10× | 4.8% | 8.5% | 0.049 |

TABLE 3

Absorbance ratios of the SEC fractions at UV 260/280 nm.

| Samples | UV 260/280 nm |
|---|---|
| SEC Peak 1 | 2.1 |
| SEC Main Peak | 1.4 |
| UV-Vis of Bulk DS | 1.3 |

TABLE 4

Hydrodynamic radius of AAV vector
Hydrodynamic radius (nm) by DLS

| Titer | Before 8× F/T | After 8× F/T |
|---|---|---|
| Source | 13.1 | 13.4 |
| 2× | 13.1 | 12.6 |
| 4× | 13.0 | 12.3 |
| 10× | 13.2 | 12.7 |

The release of ssDNA from AAV viral capsids after freeze-thaw treatments was characterized and quantitated using a fluorescence dye specially binding to ssDNA. The fluorescence dye was spiked to the AAV8-GFP samples after freeze-thaw (F/T) treatments. The samples containing different concentrations of synthetic oligonucleotide were prepared as standards to generate a standard curve. The standard curve was prepared by mixing 25 µL ssDNA standard solution with 25 µL 1× dye solution to obtain ssDNA in a concentration range from 10 ng/mL to 1000 ng/mL. The standards were analyzed to detect fluorescence at excitation 480 nm and emission 520 nm for 50 µL sample in 384 well plates.

Figure 6:
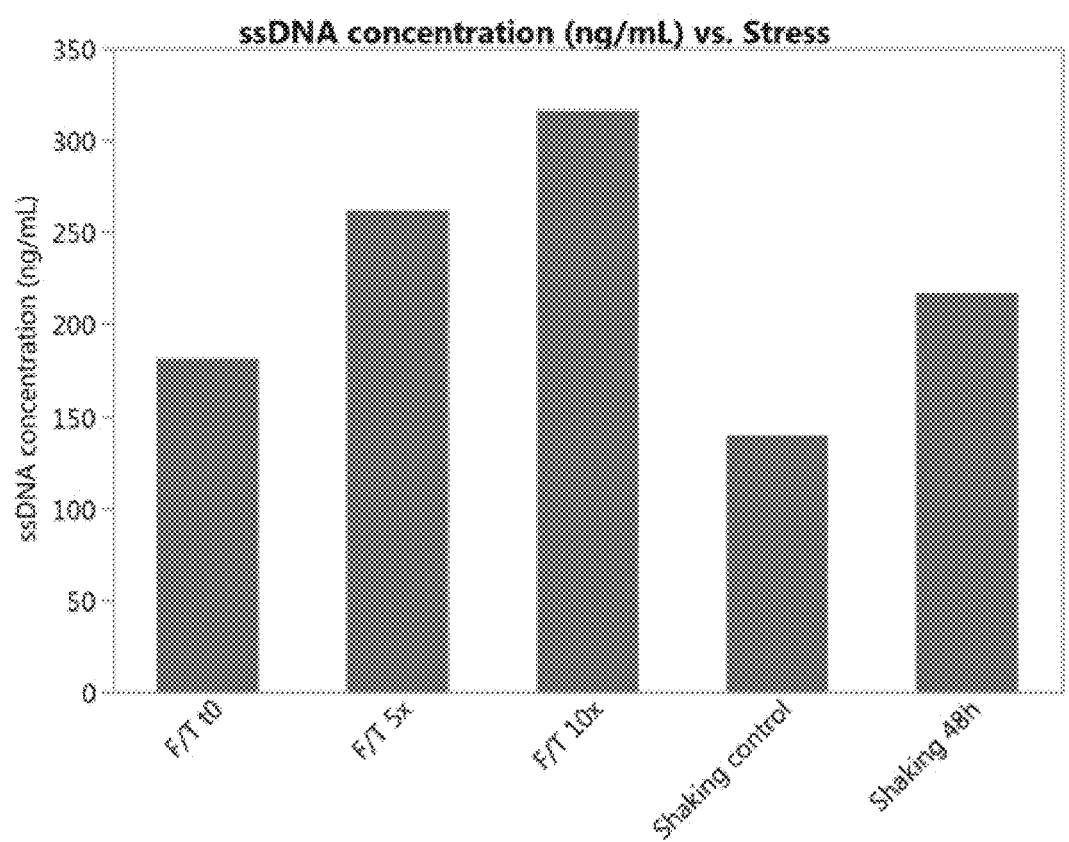
FIG. 6 shows quantitation of ssDNA concentrations in AAV8-GFP samples after variable numbers of freeze-thaw cycles and agitation treatments according to an exemplary embodiment.

AAV8-GFP samples which were treated with multiple freeze-thaw cycles, such as five freeze-thaw cycles (F/T 5×) or ten freeze-thaw cycles (F/T 10×), or shaking horizontally for 48 hours, were quantitated for ssDNA concentrations. FIG. 6 shows the quantitation of ssDNA concentrations in AAV8-GFP samples after freeze-thaw treatments and 48 hours shaking. The ssDNA quantities in AAV8-GFP samples increased after freeze-thaw treatments and shaking as shown in FIG. 6. The Y axis in FIG. 6 represents ssDNA concentration in ng/mL.

Figure 7:
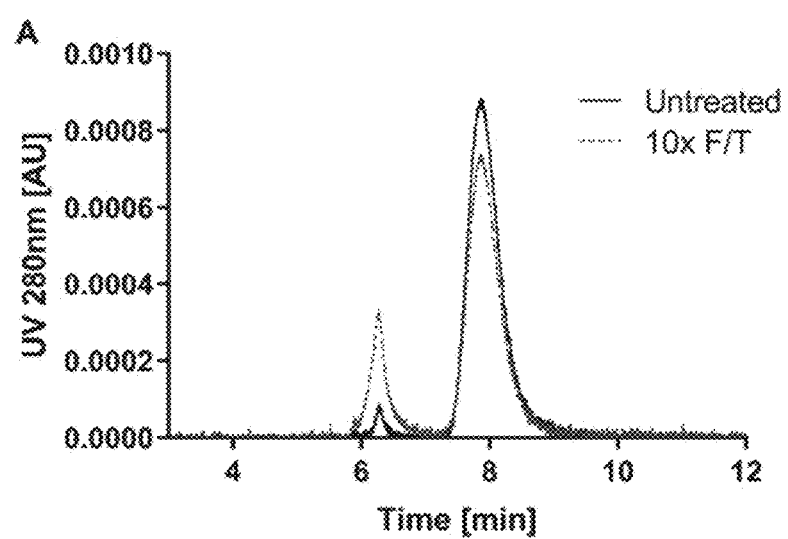
FIG. 7 shows a SE-UPLC chromatogram of AAV8.GFP at t=0 (bold line) and after ten freeze-thaw (F/T) cycles (dotted line) according to an exemplary embodiment.

To further assess the effects of freeze-thaw cycles on ssDNA leakage, SE-UPLC was used to measure changes in the levels of size variants in AAV8.GFP samples due to freeze-thaw stress. The SE-UPLC elution profile of an untreated AAV8.GFP sample at t=0 showed a main peak around 7.9 minutes of retention time, with an early elution peak at approximately 6.3 minutes, referred to herein as Peak 1, as shown in FIG. 7. Interestingly, Peak 1 increased in peak area and peak height after ten cycles of freeze-thaw. Since Peak 1 eluted earlier than the main peak in the SE-UPLC profile, a possible explanation for it is that the peak around 6.3 minutes is a high molecular weight species, such as aggregates of AAV capsids.

To further characterize the Peak 1 species, the UV signals collected at 260 nm and 280 nm from a SE-UPLC chromatogram of the AAV8.GFP sample were analyzed. In general, samples with a UV260/280 ratio of 0.6 are considered "pure" protein, and samples with a UV260/280 ratio of 1.8 are considered "pure" DNA (Wilfinger et al., Biotechniques 22(3) (1997) 474-481; Porterfield and Zlotnick, Virology 407(2) (2010) 281-288). For the AAV8 samples analyzed by SE-UPLC, the UV260/280 ratio for Peak 1 was 1.8, and the UV260/280 ratio for the main peak was 1.2 (Table 5). The UV260/280 ratio observed for the main peak indicates a contribution of UV absorbance from both protein and DNA, which is consistent with the main peak representing the AAV capsid encasing ssDNA genome. The UV260/280 ratio observed for Peak 1 suggests a DNA impurity rather than AAV aggregates, which would instead have a lower UV260/280 ratio due to contribution from protein absorbance at 280 nm.

TABLE 5

UV260/280 ratio of the pre-peak and main
peak in SE-UPLC chromatogram of AAV8.GFP

| | UV260/280 Pre-peak | UV260/280 Main Peak |
|---|---|---|
| AAV8 t = 0 | 1.8 | 1.2 |
| AAV8 10× freeze-thaw | 1.9 | 1.1 |

Figure 8:
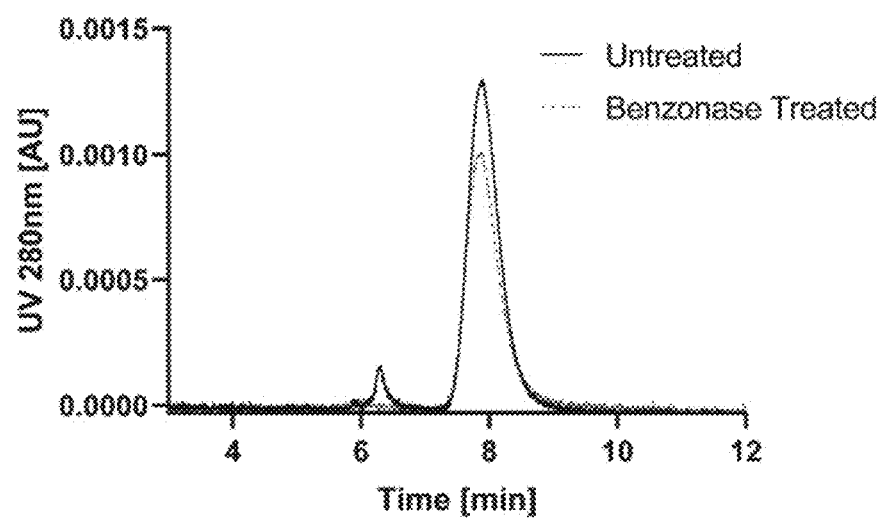
FIG. 8 shows a SE-UPLC chromatogram of AAV8.GFP with (dotted line) and without (bold line) benzonase treatment according to an exemplary embodiment.

To confirm the identity of this impurity peak, additional characterization was performed using SE-HPLC connected with a fluorescence detector (SE-HPLC-FLR), nuclease treatment, and next generation sequencing (NGS). First, a fluorescence detector was connected to the liquid chromatogram system, and the fluorescence signal was collected with excitation at 280 nm and emission at 350 nm. With the fluorescence detector, only the main peak was observed, and Peak 1 seen in the UV chromatogram was absent. This observation further confirmed the composition of impurity peak as DNA, not as a protein-containing species. Second, benzonase was used to treat the AAV8.GFP samples. Benzonase is well known as a DNA nuclease and has been used widely to digest DNA in samples for a variety of purposes (Sastry et al., Human Gene Therapy 15(2) (2004) 221-226; Antonioli et al., Journal of Chromatography A 1216(17) (2009) 3606-3612; Konz et al., Biotechnology Progress 21(2) (2005) 466-472). As shown in FIG. 8, the intensity of Peak 1 at about 6.3 minutes decreased significantly (to approximately baseline level), with a concurrent lowering of the main peak height. These data indicate that the impurity peak that eluted before the main species in SE-UPLC was indeed DNA.

To determine the identity of Peak 1 at the molecular level, it was selectively enriched for NGS analysis using the Illumina platform by collecting fractions eluted from 5.8 to 7.2 minutes and concentrating the resultant pooled fractions 5-fold (Table 6). The concentrated pool was used to prepare the NGS library according to Lecomte et al. protocol for single-stranded DNA virus sequencing (SSV-Seq) (Lecomte et al., Adeno-Associated Virus Vectors, Springer2019, pp. 85-106). The SSV-Seq protocol consists of four experimental steps: (Step 1) DNA extraction from AAV pool; (Step 2) second-strand DNA synthesis; (Step 3) Illumina sequencing library preparation; and (Step 4) high-throughput sequencing based on Illumina platform. Data analysis was performed using an in-house, dedicated bioinformatics pipeline. SSV-Seq is a sequence-agnostic technique (e.g., as opposed to qPCR), since it can detect and identify DNA species without any prior knowledge (e.g., as would be needed to generate primers).

mapped to the human genome. These observations positively identified the DNA impurity as the AAV vector genome.

To quantitate the absolute amount of free DNA in AAV samples, a well-established Quant-iT ssDNA assay was used. In this assay, an external fluorescent dye was added to the test samples to amplify the fluorescent signal of ssDNA upon excitation. A standard curve with various concentrations of oligonucleotides was established and used to calculate the DNA concentration in unknown samples. As shown in FIG. 9, the Quant-iT ssDNA detection assay displayed a 3.6-fold increase in the absolute amount of free ssDNA in AAV8.GFP samples from 364 ng/mL to 1303 ng/mL in base formulation (1×DPBS, 0.001% Pluronic F68) after ten freeze-thaw cycles. A control sample of AAV8.GFP in the base formulation heated at 95° C. for 10 minutes contained 34000 ng/mL of ssDNA. Assuming the thermal treatment at 95° C. released 100% of encased ssDNA, these data indicated that the concentration of free ssDNA increased from approximately 1% to 4% of total encased ssDNA in the AAV8.GFP sample after ten freeze-thaw cycles. Recently, Bee et al. reported increased free DNA in their AAV8-X samples after freeze-thaw cycles by a similar dye-based method (Bee et al., Journal of Pharmaceutical Sciences, 2021). An increase of 0.38%±0.08% of free DNA per freeze-thaw cycle was observed in DPBS buffer plus poloxamer 188. They observed close to 1% of free DNA in the initial sample and close to 3% of free DNA after 5 cycles of freeze-thaw, which is consistent with our data described herein. In summary, the product-related impurity presenting as a pre-peak, Peak 1, in the SE-UPLC profile was ssDNA leaked from AAV capsids.

TABLE 6

NGS results of the enriched pre-peak in SE-UPLC chromatogram of AAV8.GFP

| Replicate # | Total Raw Reads | Total Filtered Mapped Reads | Reference Name | Reads Mapped to Reference | % of mapped reads |
|---|---|---|---|---|---|
| Replicate 1 | 18410428 | 17716518 | pAdHelper_VVT | 69904 | 0.61 |
| | | | Rep-Cap8_VVT | 129735 | 1.13 |
| | | | CAG-eGFP | 11158267 | 96.98 |
| | | | CAG-eGFP-Backbone | 148288 | 1.29 |
| | | | Ad5_E1AB | 0 | |
| Replicate 2 | 18526989 | 17876959 | pAdHelper_VVT | 69957 | 0.59 |
| | | | Rep-Cap8_VVT | 126958 | 1.07 |
| | | | CAG-eGFP | 11534278 | 97.12 |
| | | | CAG-eGFP-Backbone | 145542 | 1.23 |
| | | | Ad5_E1AB | 0 | |
| Replicate 3 | 18835821 | 18179263 | pAdHelper_VVT | 71006 | 0.59 |
| | | | Rep-Cap8_VVT | 130130 | 1.08 |
| | | | CAG-eGFP | 11672300 | 97.09 |
| | | | CAG-eGFP-Backbone | 148659 | 1.24 |
| | | | Ad5_E1AB | 0 | |

With the observation that benzonase treatment eliminated the impurity peak, the DNA isolation was performed without any DNase treatment. Reads were assigned to each of the following reference sequences: (i) the ITR containing CAG-eGFP bGHpA genome; (ii) the bacterial backbone of the vector plasmid; (iii) the entire Rep-Cap8 plasmid; (iv) the entire helper plasmid; (v) fragments of the Ad5 genome integrated into the HEK293 packaging cell line genome; and (vi) the human genome primary assembly GRCh38.

The vast majority of reads from NGS mapped to the CAG-eGFP genome (~97%), followed by a lower quantity matching the vector plasmid backbone (~1.2%), Rep-Cap8 (~1-1.1%), and helper plasmid (0.6%). No reads were

Example 3. ssDNA Leakage in Other AAV Serotypes

Figure 10A:
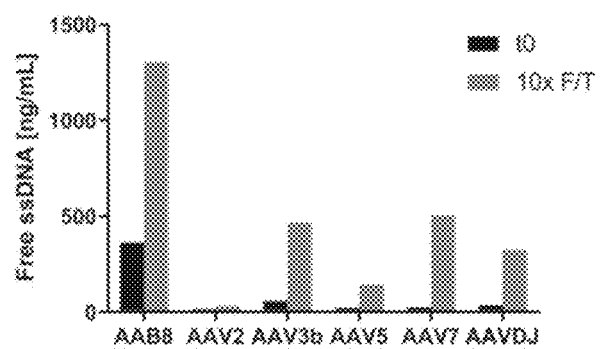
FIG. 10A shows amount of free ssDNA leaked out from AAV2, AAV3b, AAV5, AAV7, and AAVDJ after ten cycles of freeze-thaw (F/T) measured by a Quant-iT ssDNA kit according to an exemplary embodiment.
Figure 10B:
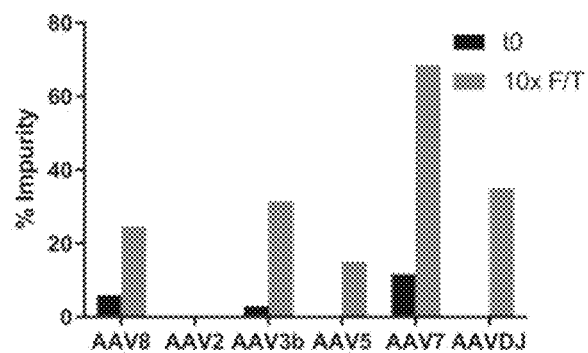
FIG. 10B shows percent impurity of a DNA peak in SE-UPLC chromatogram in AAV2, AAV3b, AAV5, AAV7, and AAVDJ after ten cycles of freeze-thaw (F/T) according to an exemplary embodiment.

To determine whether ssDNA leakage is unique to AAV8.GFP, the aforementioned analyses were applied to a panel of different AAV serotypes: AAV2, AAV3b, AAV5, AAV7, and AAVDJ. All samples were adjusted to the same titer as the AAV8 samples in the same base formulation. These samples were then subjected to ten freeze-thaw cycles and analyzed by Quant-iT assay and SE-UPLC. As shown in FIG. 10, all tested AAV serotypes initially showed very low levels of free DNA. After ten freeze-thaw cycles, significant increases in the UV signal (SE-UPLC) and fluorescent signal (Quant-iT assay) of a Peak 1 impurity were observed in all samples except for AAV2. Although the absolute amount of total leaked ssDNA due to freeze-thaw was different among the samples, ssDNA leakage was detected for all AAV serotypes except AAV2. This result suggests that the mechanism of ssDNA release from the AAV8 capsid due to freeze-thaw stress is applicable to other serotypes.

Across different serotypes of AAV, the major difference in the capsid protein sequences is in the hypervariable surface regions, which enable them to bind to different types of cells with different efficiency (Snyder and Moullier, Adeno-associated virus: methods and protocols, Springer2011). The replication and structural genes responsible for capsid proteins are generally highly conserved across serotypes, potentially making them similarly susceptible to freeze-thaw stress. Therefore, the impact of excipients on AAV stability during freeze-thaw stress could be applicable each of these AAV serotypes.

Example 4. Excipient Screening for Reducing DNA Leakage

Since the integrity and successful delivery of the encased ssDNA is crucial for AAV-based gene therapies, it is critical to minimize the leakage of ssDNA from AAV capsids under various conditions, including freeze-thaw stress. The addition of protein-stabilizing excipients to AAV formulations may aid in AAV stability against freeze-thaw stress and can also contribute to understanding the ssDNA leakage mechanism. Therefore, formulations were designed including protein-stabilizing excipients to test if, by stabilizing the capsid proteins, the ssDNA leakage during freeze-thaw cycles could be reduced. DPBS buffer was selected as the base formulation, as it is commonly used for AAV due to its consistency with physiological conditions. Several common categories of excipients including polyols (sucrose, trehalose, mannitol, glycerol, propylene glycol, and polyethylene glycol), amino acids (proline), and surfactants (Pluronic™ F68 (poloxamer 188)) were selected to assess their ability to protect protein stability (e.g., AAV capsid integrity) against freeze-thaw stress, thereby potentially reducing ssDNA leakage.

Figure 9A:
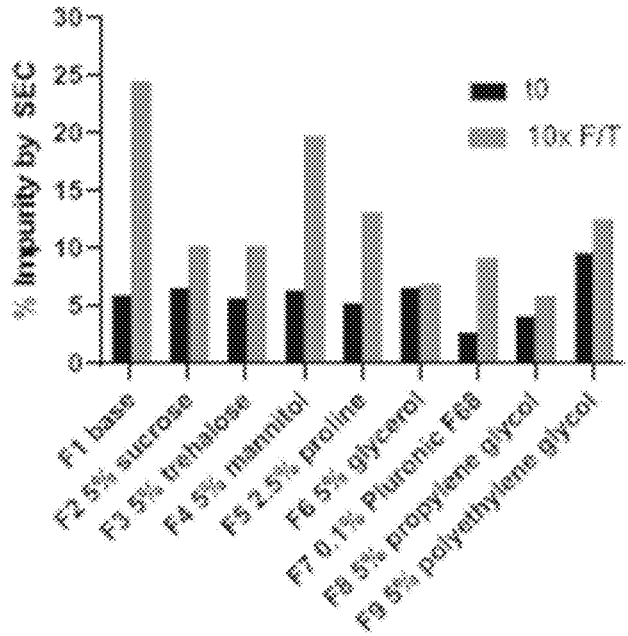
FIG. 9A shows percent impurity of a DNA peak in a SE-UPLC chromatogram of AAV8.GFP in various formulations after ten cycles of freeze-thaw (F/T) according to an exemplary embodiment.
Figure 9B:
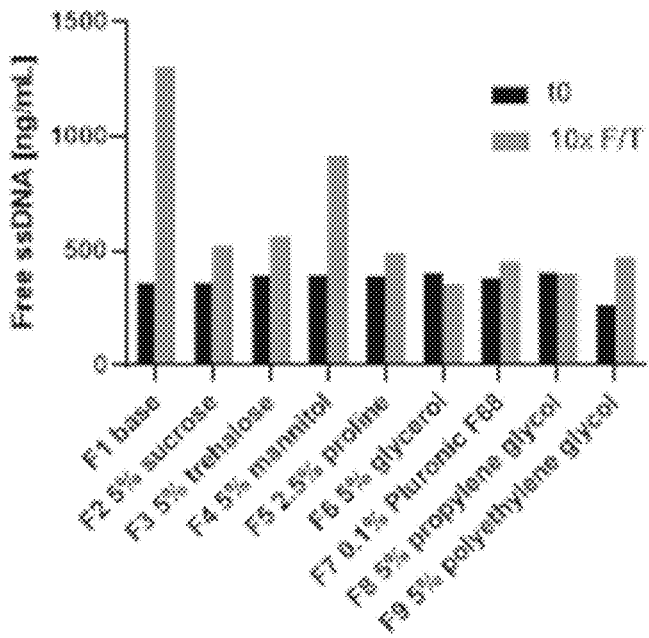
FIG. 9B shows amount of ssDNA leaked out from AAV8.GFP in various formulations after ten cycle of freeze-thaw (F/T) according to an exemplary embodiment.
Figure 11:
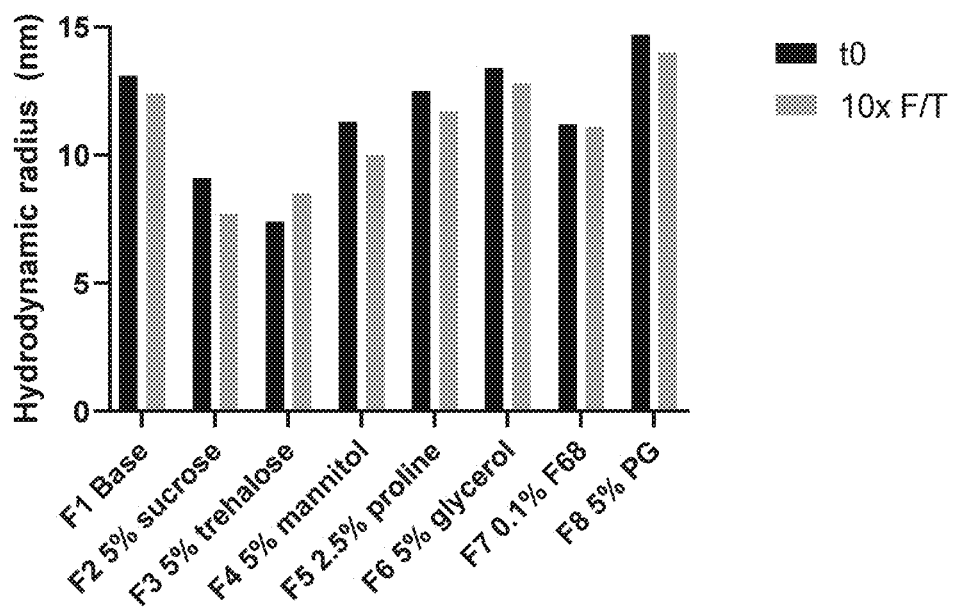
FIG. 11 shows analysis of hydrodynamic radius of viral particles in AAV8-GFP samples using DLS for screening various excipients using different formulations to reduce DNA leakage from AAV capsids according to an embodiment. The DNA impurities in AAV8-GFP samples were characterized before and after treatments of ten freeze-thaw (F/T) cycles according to an exemplary embodiment.

Results from the fluorescent-based free DNA assay and SE-UPLC analysis showed that, compared to the base formulation (base), the designed formulations showed reduced leakage of ssDNA after ten freeze-thaw cycles, as shown in FIG. 9. For example, addition of 5% sucrose or 5% trehalose reduced ssDNA leakage from a 4-fold increase to less than a 2-fold increase, as detected by SE-UPLC, as shown in FIG. 9A and Table 7. Addition of 5% sucrose or 5% trehalose reduced ssDNA leakage from a 3.6-fold increase to less than 50% increase, as detected by the fluorescent free DNA assay, as shown in FIG. 9B and Table 8. However, 5% mannitol was not as effective as sucrose and trehalose in reducing ssDNA leakage. Similar to sucrose and trehalose, 5% glycerol, 5% propylene glycol, or 5% polyethylene glycol 400 (PEG 400) reduced ssDNA leakage from a 4-fold increase to less than 50% increase, as detected by SE-UPLC, and from a 3.6-fold increase to ~50% increase, as detected by the fluorescent free DNA assay. 0.1% Pluronic F68, a surfactant often used in AAV product formulation, displayed a comparable ability in protecting the AAV from ssDNA leakage to sucrose and trehalose. Proline, as an amino acid cryoprotectant, also showed significant protective effect against ssDNA leakage based on the fluorescent free ssDNA assay and SE-UPLC analysis. Additionally, the hydrodynamic radius of the viral particles in samples were analyzed using DLS as shown in FIG. 11 and Table 9.

TABLE 7

Characterizing DNA impurities in AAV8-GFP samples using SEC

| SEC results | t0 (%) | 10× F/T (%) |
| --- | --- | --- |
| F1 Base | 6.05 | 24.48 |
| F2 5% sucrose | 6.61 | 10.16 |
| F3 5% trehalose | 5.76 | 10.27 |
| F4 5% mannitol | 6.44 | 19.81 |
| F5 2.5% proline | 5.36 | 13.16 |
| F6 5% glycerol | 6.66 | 6.91 |
| F7 0.1% F68 | 2.72 | 9.21 |
| F8 5% PG | 4.19 | 5.94 |

TABLE 8

Quantitating ssDNA impurities in AAV8-GFP samples using fluorescence dye labeling

| ssDNA (fluorescence) | t0 (ng/mL) | 10× F/T (ng/mL) |
| --- | --- | --- |
| F1 Base | 363.9 | 1302.9 |
| F2 5% sucrose | 363.2 | 520.8 |
| F3 5% trehalose | 395.9 | 565.8 |
| F4 5% mannitol | 399.8 | 917.0 |
| F5 2.5% proline | 392.1 | 490.6 |
| F6 5% glycerol | 407.2 | 356.2 |
| F7 0.1% F68 | 383.3 | 451.8 |
| F8 5% PG | 408.9 | 401.1 |
| Denatured std | n/a | 10246.6 |

TABLE 9

Analyzing hydrodynamic radius of viral particles in AAV8-GFP samples using DLS

| DLS | t0 | 10× F/T |
| --- | --- | --- |
| F1 Base | 13.1 | 12.4 |
| F2 5% sucrose | 9.1 | 7.7 |
| F3 5% trehalose | 7.4 | 8.5 |
| F4 5% mannitol | 11.3 | 10 |
| F5 2.5% proline | 12.5 | 11.7 |
| F6 5% glycerol | 13.4 | 12.8 |
| F7 0.1% F68 | 11.2 | 11.1 |
| F8 5% PG | 14.7 | 14 |

Figure 12A:
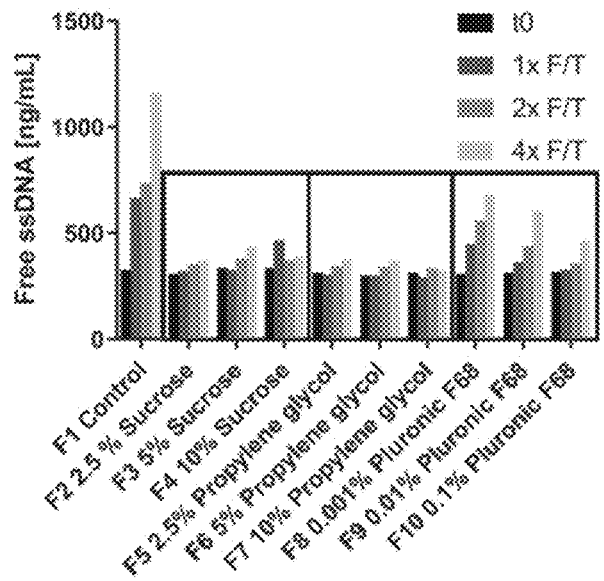
FIG. 12A shows amount of free ssDNA leaked out from AAV8.GFP in formulations with different concentrations of sucrose, propylene glycol, or Pluronic F68 after 1, 2, or 4 cycles of freeze-thaw (F/T) according to an exemplary embodiment.
Figure 12B:
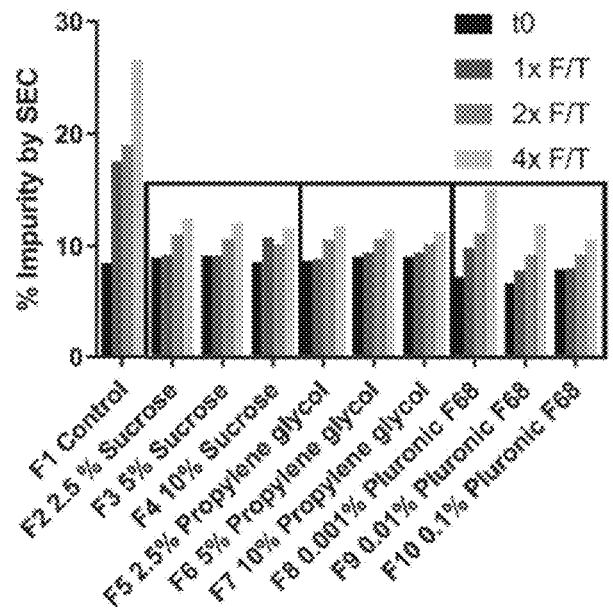
FIG. 12B shows percent impurity of a DNA peak in SE-UPLC chromatogram of AAV8.GFP in formulations with different concentrations of sucrose, propylene glycol, or Pluronic F68 after 1, 2, or 4 cycles of freeze-thaw (F/T) according to an exemplary embodiment.

A few excipients were found to be effective in minimizing leakage of ssDNA from AAV capsids after treatments of freeze-thaw cycles. The excipients that can effectively reduce ssDNA leakage during testing included sucrose, trehalose, mannitol, proline, glycerol, Pluronic F68, and propylene glycol. Based on these results, sucrose, propylene glycol, and Pluronic F68 were chosen for further analyses. Formulations with varying concentrations of sucrose (2.5%, 5%, and 10%), propylene glycol (2.5%, 5%, and 10%), and Pluronic F68 (0.001%, 0.01%, and 0.1%) were selected for analysis after 1, 2, or 4 freeze-thaw cycles, which reflect representative numbers of freeze-thaw cycles in development, manufacture, and administration of AAV drug product (s). As shown in FIG. 12, an increase in ssDNA leakage was observed as more freeze-thaw cycles were applied to AAV in F1. After four freeze-thaw cycles, both sucrose and propylene glycol exhibited significant and comparable protection against ssDNA leakage across the three tested concentrations (2.5%, 5%, and 10%). Slightly less ssDNA leakage was observed with higher concentrations of sucrose and propylene glycol. Pluronic F68 was less effective in preventing ssDNA leakage than sucrose and propylene glycol. Nevertheless, increases of Pluronic F68 concentration increasingly reduced ssDNA leakage.

Figure 13A:
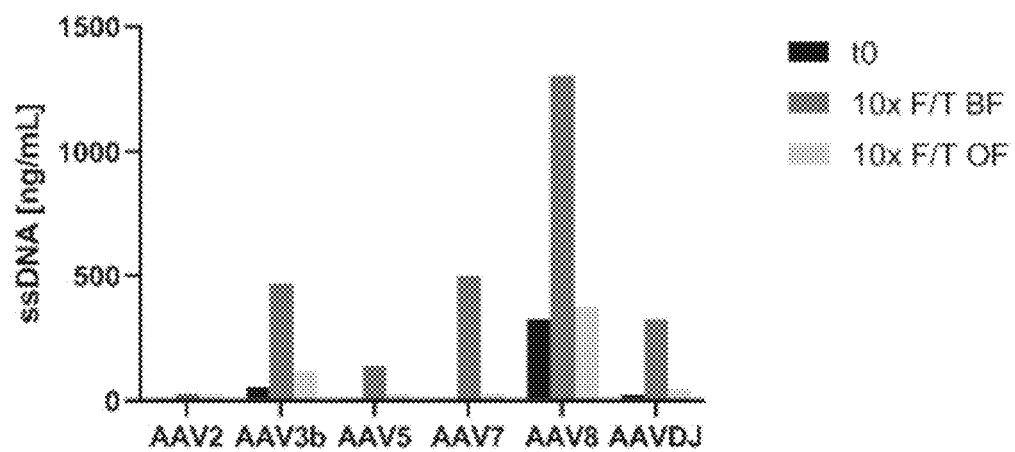
FIG. 13A shows amount of free ssDNA leaked out from AAV2, AAV3b, AAV5, AAV7, AAV8, and AAVDJ in the base formulation (BF) or optimized formulation (OF) after ten cycles of freeze-thaw (F/T) according to an exemplary embodiment.
Figure 13B:
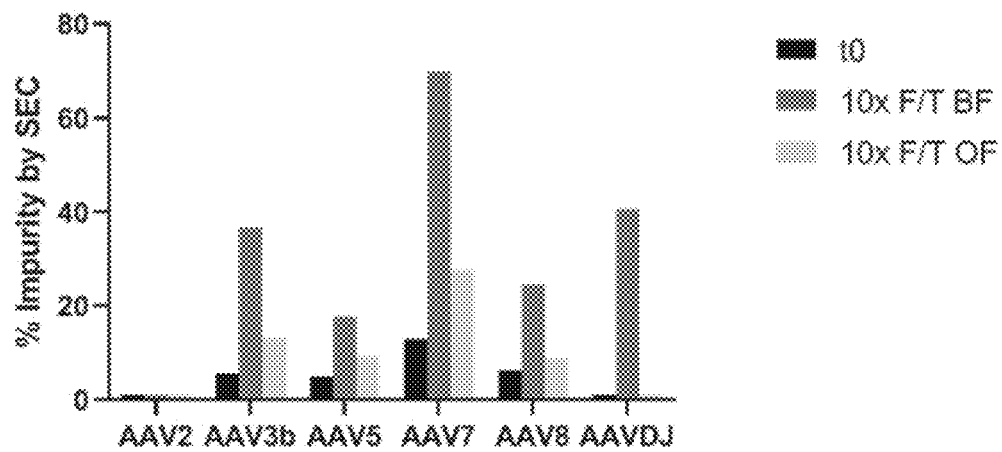
FIG. 13B shows percent impurity of a DNA peak in SE-UPLC chromatogram of AAV2, AAV3b, AAV5, AAV7, AAV8, and AAVDJ in the base formulation (BF) or optimized formulation (OF) after ten cycles of freeze-thaw (F/T) according to an exemplary embodiment.

Cryoprotectants and surfactants are usually used together in biologic formulations to provide protection against various types of stresses. To test the effect of combined excipients against freeze-thaw stress and to test whether protein-stabilizing excipients reduce the ssDNA leakage in other serotypes, formulations with both sucrose and Pluronic F68 were designed and evaluated with various AAV serotypes In FIG. 13, the base formulation (BF) was DPBS, while the optimized formulation (OF) contained 10% sucrose and 0.1% Pluronic F68 in DPBS. The optimized formulation dramatically inhibited the ssDNA leakage for AAV3b, AAV5, AAV7, AAV8, and AAVDJ after 10 freeze-thaw cycles compared to the base formulation without sucrose and Pluronic F68. By fluorescent-based free DNA assay, the reduction in ssDNA leakage was between 10- and 20-fold; by SE-UPLC, the reduction of ssDNA impurity peak area was in 3- to 10-fold ranges, with a 40-fold reduction observed for AAVDJ. Interestingly, the protection effect was marginal for AAV2, likely because the free DNA leakage without cryoprotectant and surfactant was negligible compared to other serotypes. Based on these findings, an optimized formulation with cryoprotectant and surfactant could protect various AAV serotypes from freeze-thaw stress.

Excipients are chosen based on their properties and established mechanism for protein stabilization. Sucrose and trehalose, as subtypes of polyol, are among the most commonly used sugar-based excipients to stabilize proteins (Singh, Challenges in Protein Product Development, Springer2018, pp. 63-95). Glycerol, propylene glycol, and polyethylene glycol (PEG 400 for these experiments) are also conventional polyol cryoprotectants for protein molecules. Cryoprotectants function by various mechanisms including preferential exclusion from protein surface, forming glassy matrix around protein molecules, or forming hydrogen bonds with proteins (Timasheff, Annual Review of Biophysics and Biomolecular Structure 22(1) (1993) 67-97; Corradini et al., Scientific Reports 3(1) (2013) 1-10; Markarian et al., Cryobiology 49(1) (2004) 1-9). Pluronic F68 is added in AAV formulations as a surfactant against mechanical stress during production and transportation and interfacial stress during freeze-thaw cycles, and it is commonly used in protein pharmaceuticals for these purposes (Nail and Akers, Development and manufacture of protein pharmaceuticals, Springer Science & Business Media2012). Pluronic F68, as a nonionic surfactant, could reduce the surface tension at the interface created by mechanical disturbance and freeze-thaw cycles, and hence inhibit the adsorption of protein at the interface due to competition with the surfactant (Kasimbeg et al., Journal of Pharmaceutical Sciences 108(1) (2019) 155-161; Khan et al., European Journal of Pharmaceutics and Biopharmaceutics 97 (2015) 60-67; Dixit et al., Pharmaceutical Research 30(7) (2013) 1848-1859). Given the role of these excipients in stabilizing protein structure and maintaining stability, these findings also support the elucidation of the ssDNA leakage mechanism in AAV capsids.

In these stability studies, an increased level of free ssDNA in the AAV solutions after freeze-thaw cycles was observed. While the free ssDNA in bulk drug substance before freeze-thaw treatment could be residual DNA carried over from cell culture or purification, the increased ssDNA after multiple freeze-thaw cycles is genome ssDNA which was shown to have leaked out of the AAV capsids. This is supported by the NGS characterization results and is consistent with the observation that protein stabilizing excipients inhibited the leakage of ssDNA post freeze-thaw stress. Whether ssDNA leakage occurred through genome ejection (i.e., with capsid intact) or via disassembly of AAV capsids is further discussed below.

AAV8 and AAV9 have been investigated at the single viral capsid level to explore the degradation mechanism under thermal stress, such as incubation at 50 to 80° C. (Bernaud et al., Journal of Biological Physics 44(2) (2018) 181-194). The encased DNA genome was ejected from an intact or partially unfolded capsid, which was visualized by atomic force microscopy (AFM). Hypothetically, if ejection is the main mechanism of ssDNA leakage, the full capsid titer should decrease with a concurrent increase in empty capsid titer, and the sum of full and empty capsids should remain constant pre- and post-stress. Alternatively, if ssDNA leakage occurs by AAV disassembly (i.e., capsid rupture), the total capsid titer should decrease post-stress due to a decrease in full capsid titer (empty capsid titer should remain unaffected). Since free ssDNA was ~1% of total encased ssDNA in untreated AAV samples and increased to ~5% after 10 freeze-thaw cycles, the change in full/empty capsid titer(s) should be at a similar level of magnitude.

Unfortunately, with a typical 10-20% coefficient of variation (CV %) in an enzyme-linked immunosorbent assay (ELISA) assay for capsid titer, it is difficult to determine whether a concomitant 1% to 5% change in capsid titer is occurring with a 1% to 5% change in free ssDNA. SE-UPLC analysis at 260 and 280 nm was similarly inconclusive in the determination of the degradation mechanism due to the variance of the method and the limits of the approximations and estimations (e.g., extinction coefficient and molecular mass of ssDNA and capsid protein and the pathlength of the flow cell in the UV detector). Dynamic light scattering (DLS) was utilized to monitor size variants as an alternative method to SE-UPLC, and no obvious AAV aggregation or fragmentation was seen. A careful examination of the SE-UPLC elution profile also did not reveal any obvious VP protein peaks after the AAV capsids. In summary, the variabilities of the DLS and SE-UPLC (potentially ELISA as well) methods prevented a conclusive elucidation of the mechanism of ssDNA leakage from AAV. Further investigation with more accurate and precise titer method(s) may be needed to better understand the ssDNA leakage mechanism. As noted earlier, visualization tools like AFM might also present a view of capsid integrity post freeze-thaw cycles and contribute to the understanding of mechanisms.

AAV-based gene therapy drug products usually undergo one or more freeze-thaw cycles during manufacturing, transportation, storage, and administration. The present characterization of AAV8 in DPBS buffer has revealed that part of the encased ssDNA was leaked out from AAV8 after even one freeze-thaw cycle. The identity of the leaked ssDNA was confirmed as the genomic DNA initially encased in the capsid. The extent of genome leakage increased with more freeze-thaw cycles. Genome leakage was also observed to varying extents in other tested serotypes including AAV2, AAV3b, AAV5, AAV7, and AAVDJ.

Formulation screening studies identified excipients, such as polyols, amino acids, and surfactants, which are effective in inhibiting genome DNA leakage from AAV. Further studies with sucrose, propylene glycol, and Pluronic F68 led to a better understanding of their effect on AAV stability with respect to ssDNA leakage. These results provide insight on ssDNA leakage from AAV, with stress from freezing and thawing as a degradation pathway. Furthermore, these findings are valuable to the future development of stable AAV drug substance and drug product formulations.

What is claimed is:

1. A method for protecting an adeno-associated virus (AAV) vector from leaking packed nucleic acids, comprising:

obtaining a sample including at least one AAV vector; and adding to said sample a stabilizing composition to form a protective formulation, wherein the protective formulation protects at least one AAV vector from leaking packed nucleic acids, wherein the stabilizing composition comprises concentrations of 2.5% to 10% sucrose and 0.001% to 0.2% poloxamer 188 in DPBS, wherein reduction in ssDNA leakage is between 10- and 20-fold as measured by fluorescent-based free DNA assay, and reduction of ssDNA impurity peak area is 3- to 10-fold.

2. The method of claim 1, wherein the AAV vector is exposed to at least one freeze-thaw cycle.

3. The method of claim 1, wherein the packed nucleic acids are single-stranded DNA genome of AAV.

4. The method of claim 1, wherein sucrose is at concentration of 10%.

5. The method of claim 1, wherein poloxamer 188 is at a concentration of 0.1%.

6. The method of claim 2, wherein the AAV vector is exposed to 1 to 10 freeze-thaw cycles.

\* \* \* \* \*